United States Patent
Husted et al.

(10) Patent No.: US 10,475,154 B2
(45) Date of Patent: Nov. 12, 2019

(54) MACHINE SURROUND VIEW SYSTEM AND METHOD FOR GENERATING 3-DIMENSIONAL COMPOSITE SURROUND VIEW USING SAME

(71) Applicant: Caterpillar Inc., Peoria, IL (US)

(72) Inventors: Douglas Jay Husted, Secor, IL (US); David Lee Zwetz, II, Morton, IL (US); Adam Paul Roesner, Dunlap, IL (US); Edward Yii-Hsin Lin, Dunlap, IL (US); Hassen Ali, Peoria, IL (US); Peter Petrany, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 195 days.

(21) Appl. No.: 15/675,224

(22) Filed: Aug. 11, 2017

(65) Prior Publication Data
US 2019/0050959 A1    Feb. 14, 2019

(51) Int. Cl.
| | | |
|---|---|---|
| *G06T 3/00* | (2006.01) | |
| *G06T 3/40* | (2006.01) | |
| *G06T 7/70* | (2017.01) | |
| *B60R 1/00* | (2006.01) | |

(52) U.S. Cl.
CPC .............. *G06T 3/0081* (2013.01); *B60R 1/00* (2013.01); *G06T 3/005* (2013.01); *G06T 3/4038* (2013.01); *G06T 7/70* (2017.01); *B60R 2300/102* (2013.01); *B60R 2300/105* (2013.01); *B60R 2300/303* (2013.01)

(58) Field of Classification Search
CPC ....... G06T 3/0081; G06T 3/4038; G06T 7/70; B60R 2300/303; B60R 2300/102; B60R 2300/105
See application file for complete search history.

(56) References Cited

U.S. PATENT DOCUMENTS

| | | | |
|---|---|---|---|
| 2017/0061689 A1* | 3/2017 | Petrany | ................. G06T 19/006 |
| 2017/0103580 A1 | 4/2017 | Petrany et al. | |
| 2017/0148222 A1* | 5/2017 | Holzer | ................. H04N 13/243 |
| 2017/0195564 A1* | 7/2017 | Appia | ................. H04N 5/23238 |
| 2018/0210442 A1* | 7/2018 | Guo | ..................... G05D 1/0038 |
| 2018/0232851 A1* | 8/2018 | Scholl | ................... G06T 3/0018 |

* cited by examiner

Primary Examiner — Yon J Couso

(57) ABSTRACT

A surround view system for a machine is provided. The surround view system includes a plurality of image capturing devices generating image data of surroundings of the machine, and an object detection system for detecting an object in a target field of view of the machine and generating object position data corresponding to the object. The surround view system also includes an image processing system configured to generate an initial 3-dimensional composite surround view by projecting the image data on a virtual model corresponding to the machine. The virtual model has a 3-dimensional shape based on an initial calibration position data. The image processing system is also configured to modify the 3-dimensional shape of the virtual model based on the object position data, and generate an updated 3-dimensional composite surround view by projecting the image data on the virtual model having a modified 3-dimensional shape.

20 Claims, 4 Drawing Sheets

MACHINE SURROUND VIEW SYSTEM AND METHOD FOR GENERATING 3-DIMENSIONAL COMPOSITE SURROUND VIEW USING SAME

TECHNICAL FIELD

The present disclosure relates generally to a surround view system for a machine and, more particularly, to generating a 3-dimensional composite surround view.

BACKGROUND

Machines, including various on-highway and off-highway machines, are increasingly being equipped with vision systems, incorporating cameras and displays. Vision systems may be used for various purposes, including, for example, monitoring machine surroundings, and assisting with maneuvering and manipulating the machine to perform various work tasks. Vision systems typically include one or more cameras supported on the machine and configured for capturing image data and transmitting the image data to a controller of the machine. The controller may then process the image data, and transmit processed images to a user device of the machine for display. A common example of such a vision system includes a rear-view, or back-up, camera and display.

More recently, vision systems have advanced into surround view systems, which provide a 360-degree view of the area surrounding the machine. Surround view systems may include multiple cameras mounted at various locations of the machine, and may provide various views of the machine, including a top-down view, which eliminates blind spots. The views from the multiple cameras may be stitched together to form a composite surround view. Additional views may include a 3-dimensional composite surround view, which may include images captured by the multiple cameras and projected on a simulated 3-dimensional curved surface. In some systems, the simulated 3-dimensional curved surface may have an initial calibration resulting in an initial shape; however, as the machine travels through different environments, the 3-dimensional composite surround view based on the simulated 3-dimensional curved surface, as initially calibrated, may become distorted or degraded.

U.S. Patent Application Publication No. 2012/0262580 to Huebner et al. (hereinafter "Huebner") discloses a vehicle surround view system including a processing device processing image data and generating a surround view on a simulated predetermined shape that can be viewed from a display. The simulated predetermined shape can have a flat bottom with a rectangular shape and a rim with a parabolic shape.

SUMMARY OF THE INVENTION

In one aspect, a surround view system for a machine is provided. The surround view system includes a plurality of image capturing devices generating image data of surroundings of the machine, and an object detection system for detecting an object in a target field of view of the machine and generating object position data corresponding to the object. The surround view system also includes an image processing system configured to generate an initial 3-dimensional composite surround view by projecting the image data on a virtual model corresponding to the machine. The virtual model has a 3-dimensional shape based on initial calibration position data. The image processing system is also configured to modify the 3-dimensional shape of the virtual model based on the object position data, and generate an updated 3-dimensional composite surround view by projecting the image data on the virtual model having a modified 3-dimensional shape.

In another aspect, a method of generating a 3-dimensional composite surround view using a surround view system is provided. The method includes steps of generating image data of surroundings of the machine using a plurality of image capturing devices, and generating an initial 3-dimensional composite surround view, using an image processing system, by projecting the image data on a virtual model, wherein the virtual model has a 3-dimensional shape based on initial calibration position data. The method also includes steps of detecting an object in a target field of view of the machine and generating object position data corresponding to the object, modifying the 3-dimensional shape of the virtual model, using the image processing system, based on the object position data, and generating an updated 3-dimensional composite surround view, using the image processing system, by projecting the image data on the virtual model having a modified 3-dimensional shape. The updated 3-dimensional composite surround view may be displayed on a user display.

In yet another aspect, an image processing system for generating a 3-dimensional composite surround view is provided. The image processing system includes a processor configured to receive image data of surroundings of the machine, and generate an initial 3-dimensional composite surround view by projecting the image data on a virtual model, wherein the virtual model has a 3-dimensional shape based on initial calibration position data. The processor is further configured to receive object position data corresponding to an object in a target field of view of the machine, modify the 3-dimensional shape of the virtual model based on the object position data, and generate an updated 3-dimensional composite surround view by projecting the image data on the virtual model having a modified 3-dimensional shape.

Other features and aspects will be apparent from the following description and accompanying drawings.

DETAILED DESCRIPTION

Figure 1:
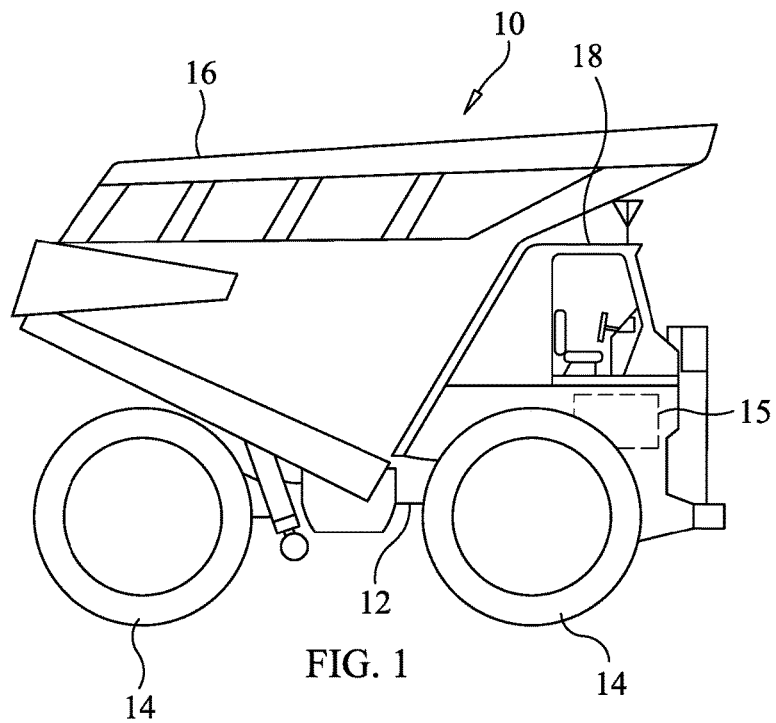
FIG. 1 is a side view of an exemplary machine, according to the present disclosure.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

An exemplary embodiment of a machine 10, according to the present disclosure, is shown generally in FIG. 1. The machine 10 may be a mining truck, as shown, or any other on-highway or off-highway machine. The machine 10 may include a frame 12 supporting a plurality of ground-engaging elements, such as wheels, 14, and an engine 15. A dump body 16 may be pivotably mounted and/or otherwise supported on the frame 12. An operator station 18 may also be supported on the frame 12 and may house various operator controls and interfaces. Although a specific machine embodiment is shown, the present disclosure is applicable to a variety of machines and vehicles operating in a variety of applications.

Figure 2:
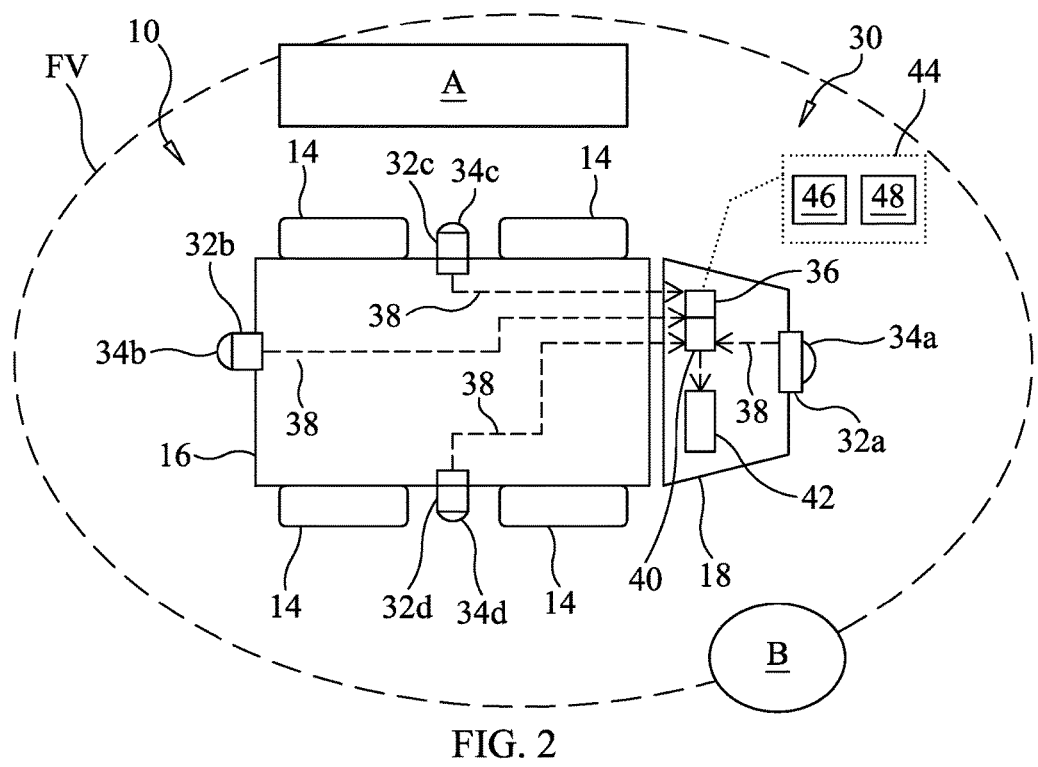
FIG. 2 is a schematic top view of the machine of FIG. 1, including components of a surround view system, according to an exemplary embodiment of the present disclosure.

A surround view system 30 for the machine 10 is shown generally in FIG. 2. The surround view system 30 may include a plurality of image capturing devices 32, such as cameras, sensors, or other devices, mounted or otherwise supported on the machine 10 at various locations, and configured for generating image data of the surroundings of the machine 10. For example, the image capturing devices 32 may include a front-end camera 32a, a rear-end camera 32b, a left-side camera 32c, and a right-side camera 32d, all of which generally face away from the machine 10. Although four image capturing devices 32 are shown, it should be appreciated that a different number of image capturing devices 32 may be used, depending on the particular application. Typically, at least two image capturing devices 32 will be used. According to the exemplary embodiment, each of the image capturing devices 32 may include a respective fisheye lens 34a, 34b, 34c, and 34d. Each fisheye lens 34a, 34b, 34c, and 34d may be an ultra-wide angle lens, which may ensure overlapping images between the image capturing devices 32 to ensure a complete surround view. According to some embodiments, each fisheye lens 34a, 34b, 34c, and 34d may have a field of vision covering up to about 180 degrees.

The surround view system 30, configured for capturing 360 degree views surrounding the machine 10, may also include an image processing system 36. The image processing system 36, which may be a system or device, may communicate with the image capturing devices 32, such as via wired and/or wireless communication lines 38. For example, the image capturing devices 32 may generate image data of the surroundings of the machine 10, and may transmit the image data to the image processing system 36 via the communication lines 38. According to some embodiments, the image capturing devices 32 may be video cameras configured for capturing a plurality of images combined as a video, or may be cameras configured for capturing single images. The image data may be received at the image processing system 36, and/or a component thereof, and may be processed as described below.

The surround view system 30 may also include an object detection system 40 for detecting objects, such as, for example, objects A and B, in a target field of view FV of the machine 10 and determining positions of the objects A and B. That is, object position data corresponding to the objects A and B (which may include any stationary or mobile objects, devices, and/or people) may be generated by the object detection system 40. For example, the object position data, which may include GPS coordinate data, may be based on positions or locations of the objects A and B, distances of the objects A and B from the machine 10, or any combination thereof. The object detection system 40, which will also be discussed in greater detail with reference to FIG. 5, may also communicate with image capturing devices 32 (which may include at least one of camera, radar, laser, light detection and ranging (LiDAR), video or ultrasound devices, via communication lines 38). Objects, such as objects A and B, may be detected by the object detection system 40 if and/or when they come within a predetermined proximity to the machine 10.

The image processing system 36 and the object detection system 40 may each include or communicate with one or more controllers, such as a controller 44, for electronically monitoring and/or controlling various machine systems and/or components. In particular, for example, the controller 44 may be configured to process image data from the image processing system 36 using any of a variety of known image data processing techniques, and/or process object position data from the object detection system 40 using any of a variety of known object position data processing techniques. The controller 44 may include a processor 46, a memory 48, and an input/output circuit that facilitates communication internal and external to the controller 44. The processor 46, for example, may control operation of the controller 44 by executing operating instructions, such as, for example, computer readable program code stored in the memory 48, or other computer readable storage device, wherein operations may be initiated internally or externally to the controller 44.

Control schemes may be utilized that monitor outputs of systems or devices, actuators, or control units, via the input/output circuit to control inputs to various other systems or devices. Memory 48, as used herein, may comprise temporary storage areas (such as, for example, cache, virtual memory, or random-access memory) and/or permanent storage areas (such as, for example, read-only memory, removable drives, network/internet storage, hard drives, flash memory, memory sticks, and/or any other known volatile or non-volatile data storage devices).

Figure 3:
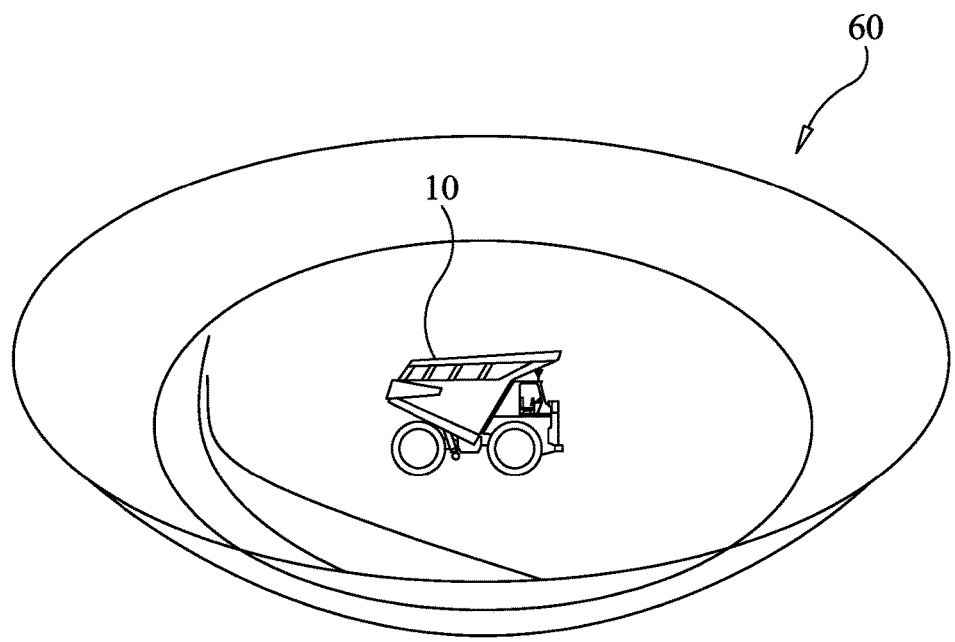
FIG. 3 is an exemplary 3-dimensional composite surround view, according to the present disclosure.

Either or both of the image processing system 36 and the object detection system 40 may communicate with a user display 42, or other similar device, via communication lines 38. The user display 42 may be positioned within the operator station 18, and may display information relating to operation of the machine 10. For example, a 3-dimensional composite surround view 60, similar to what is shown in FIG. 3, may be generated by the surround view system 30, as will be described below, and transmitted to the user display 42 via communication lines 38. The 3-dimensional composite surround view 60 may thereafter be displayed on the user display 42, along with additional data or images. For example, bounding boxes may surround detected objects and/or icons may be positioned to indicate the direction of the one or more camera views. Additionally, or alternatively, distance information to a detected object may be displayed. Additionally, or alternatively, machine health information and additional views or images of the machine 10 and/or the surroundings of the machine 10 may be provided.

Figure 4:
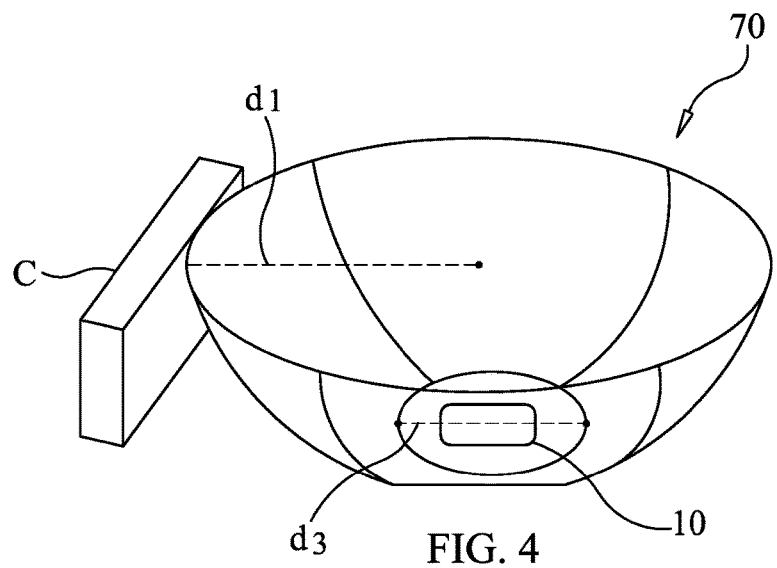
FIG. 4 is an exemplary bowl-shaped model having a 3-dimensional shape based on initial calibration position data, according to the present disclosure.

The 3-dimensional composite surround view 60 may be generated by the surround view system 30 by projecting image data received from the image capturing devices 32 onto a virtual model 70, such as a bowl-shaped model, of FIG. 4. For example, the image data from the surround view system 30 may be stitched together to generate the 3-dimensional composite surround view 60. The bowl-shaped model 70, which is a virtual or simulated model utilized by the surround view system 30, may have a 3-dimensional shape, as shown, which may be based on initial calibration position data $d_1$. That is, a diameter, or outer diameter, which may be the largest diameter, of the 3-dimensional shape may be based on the initial calibration position data $d_1$. The initial calibration position data $d_1$ may be selected or set in a number of different ways. For example, the initial calibration position data $d_1$ may be based on a set distance from a target object, such as object C, such as before or during startup of the machine 10. Although a bowl-shaped model is shown, it should be appreciated that the virtual model 70 may include a variety of other 3-dimensional shapes.

An inner diameter $d_3$ may, according to some embodiments, correspond to a shape and/or size of the machine 10 or may be set to some distance away from the machine 10. The diameter $d_3$, which may be the smallest diameter of the bowl-shaped model 70, may be set such that the machine 10 is substantially enclosed by an inner circle or oval defined by the diameter $d_3$. The bowl-shaped model 70 may typically be symmetrical; however, according to the present disclosure, the bowl-shaped model 70 may alternatively be asymmetrical. For example, either or both of the circular or oval shapes defined by the distances or diameters $d_1$ and $d_3$ may be asymmetrical, such that the bowl-shaped model 70 cannot be divided into two or more identical pieces arranged in an organized fashion. A curvature of the bowl-shaped model 70, which may include the arc between the inner diameter $d_3$ and the outer diameter $d_1$, may be set according to any of a variety of known algorithms. According to some embodiments, the inner diameter $d_3$ may correspond to a bottom of the bowl-shaped model 70 while the outer diameter $d_1$ may correspond to a top of the bowl-shaped model 70.

Figure 5:
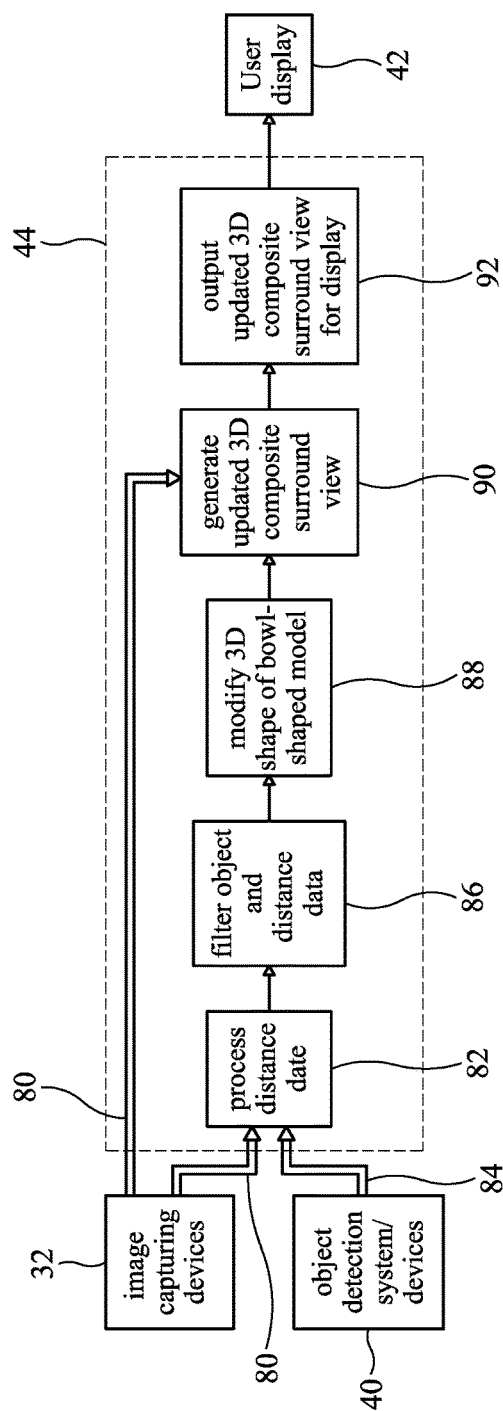
FIG. 5 is a block diagram of components of the surround view system of FIG. 2.

Turning now to FIG. 5, a block diagram of the surround view system 30 is shown, and a method of generating a 3-dimensional composite surround view, such as the 3-dimensional composite surround view 60 of FIG. 3, according to the present disclosure will be described with reference to the same. Image capturing devices 32, as described above, may generate image data 80 corresponding to surroundings of the machine 10 and transmit the image data 80 to the controller, which is shown generally at 44 in FIG. 5. In particular, the image capturing devices 32 may transmit the image data 80 to a processing module 82.

The object detection system 40 may also transmit data (such as, for example, object position data 84), to the processing module 82. As stated above, the object position data 84 may be generated by a camera or sensor device, such as image capturing devices 32, configured to detect objects within proximity to the machine 10. The processing module 82 may receive the image data 80 and the object position data 84, and may process the object position data 84 to identify objects within proximity to the machine 10. For example, objects within the target field of view FV, such as objects A and B of FIG. 2, may be detected.

The processing module 82, using the controller 44, may process the object position data 84, such as by determining or considering distance and movement of the objects, such as objects A and B. At block 86, the controller 44 or, more particularly, the processor 46, may filter the processed object position data 84 to determine which objects to consider and which objects not to consider, or to ignore. For example, objects that are at least a predetermined distance away from the machine 10 (e.g., a distance exceeding a threshold distance) and/or are of a particular size (e.g., less than the particular size) may be ignored. Referring also to FIG. 2, object A may have a size and/or proximity such that it may be considered, whereas object B may not. However, various other selection schemes may be utilized.

At block 88, the shape of the bowl-shaped model 70 may be modified based on the position of objects to be considered. For example, a modified bowl-shaped model having a modified 3-dimensional shape is shown generally at 100 in FIG. 6. In particular, the shape may be modified such that an upper diameter of the modified 3-dimensional shape is based on an updated distance $d_2$. The updated distance $d_2$, which may be greater than or less than the initial calibration position data $d_1$, may be selected or set based on a distance from one or more detected objects, such as, for example, object D, as detected by the object detection system 40. The resulting shape, which may be defined by distances of objects from a central point of the shape, may be symmetrical or asymmetrical, as mentioned above. An inner diameter $d_4$, which may be modified from the initial inner diameter $d_3$, may be set such that the machine 10, or a virtual representation thereof, is surrounded by a resulting shape, such as a circle or oval. According to some embodiments, the updated inner diameter $d_4$ may be based on the detected objects, with the updated distance $d_2$ being a function of the inner diameter $d_4$.

Then, at block 90, image data 80 may be received from the image capturing devices 32 and merged and stitched, or otherwise processed, in a manner known to those skilled in the art. An updated 3-dimensional composite surround view (the view being similar to 3-dimensional composite surround view 60 of FIG. 3) may be generated at block 92 by projecting the image data 80 on the bowl-shaped model 100 having a modified 3-dimensional shape. The surround view system 30 may be configured such that objects surrounding the machine 10 are detected and the 3-dimensional shape of the bowl-shaped model 70 is dynamically modified during movement of the machine 10. As such, a more realistic representation of the environment on a 2-dimensional display 42 is continuously provided.

INDUSTRIAL APPLICABILITY

The present disclosure relates generally to a surround view system for a machine. The surround view system generally includes a plurality of image capturing devices and a display. More particularly, the present disclosure relates to generating a 3-dimensional composite surround view of surroundings of the machine by projecting image data from the image capturing devices on a bowl-shaped model corresponding to the machine. Yet further, the present disclosure is applicable to a system and method for modifying the 3-dimensional composite surround view by modifying a 3-dimensional shape of the bowl-shaped model.

Referring generally to FIGS. 1-6, a surround view system 30 for a machine 10 may include a plurality of image capturing devices 32 configured for generating image data 80 of surroundings of the machine 10. The surround view system 30 may also include an image processing system 36, which is in communication with the image capturing devices 32 and includes a controller 44. An object detection system 40 is also provided and is configured to detect objects, such as objects A and B, within a target field of view FV of the machine 10. The object detection system 40 also includes, or is in communication with, the controller 44. The controller 44 may be configured to receive and process image data 80 from the image capturing devices 32 and object position data from the object detection system 40.

Figure 7:
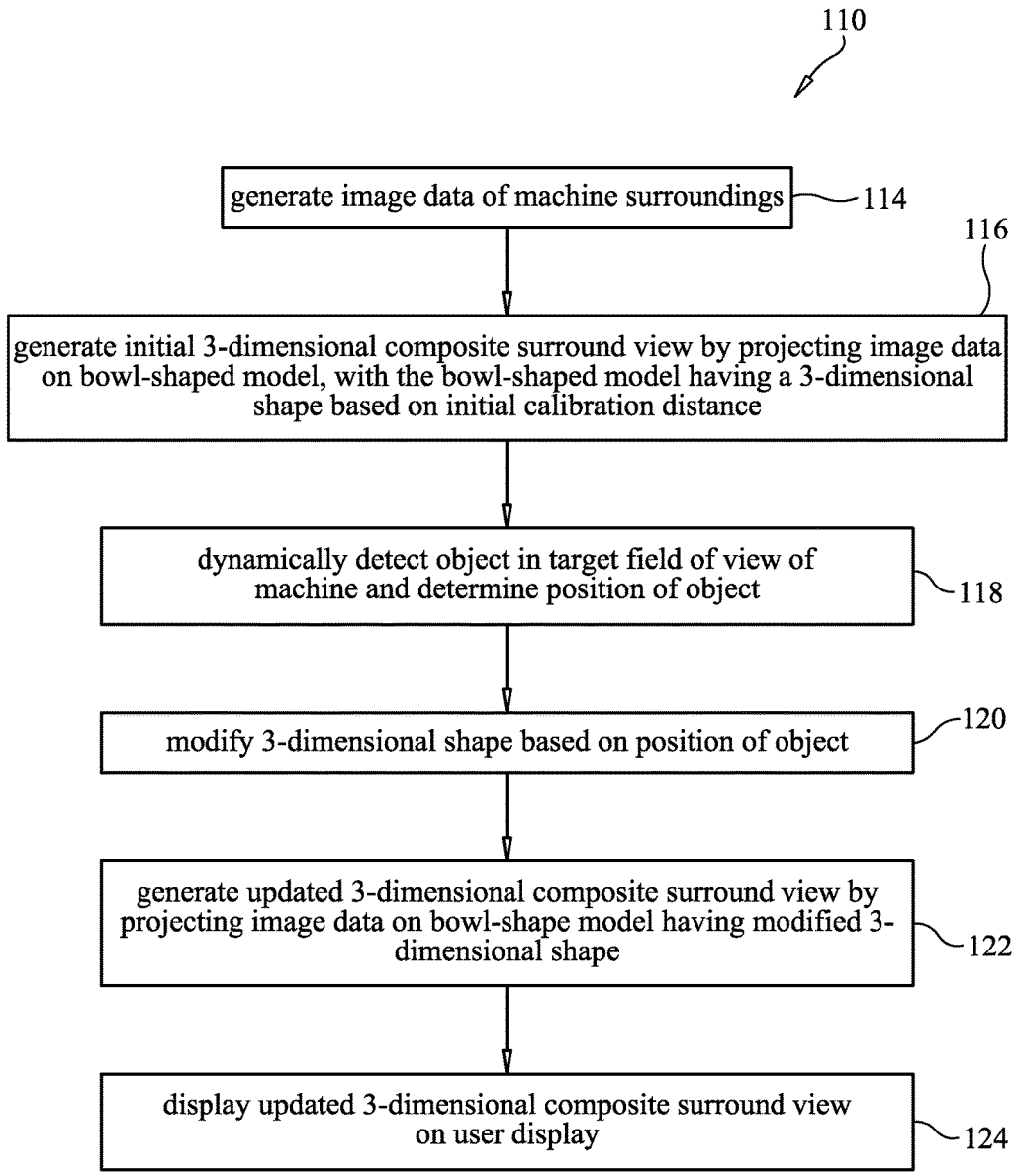
FIG. 7 is a flow diagram illustrating an exemplary method of generating a 3-dimensional composite surround view using the surround view system of the present disclosure.

Referring also to FIG. 7, a flow diagram 110 illustrating an exemplary method of generating a 3-dimensional composite surround view, such as 3-dimensional composite surround view 60, using the surround view system 30 of the present disclosure is shown. The method, the steps of which may be performed in an alternative order, may be implemented in whole or in part by the controller 44, and/or other similar component or device, and may run, or execute, continuously or intermittently. Variations in the method may occur without deviating from the scope of the present disclosure.

At box 114, the image capturing devices 32 may generate image data 80 of surroundings of the machine 10, and transmit the image data 80 to the image processing system 36. The image processing system 36, which may include the controller 44, may receive and process signals generated by the image capturing devices 32. The image processing system 36 may generate an initial 3-dimensional composite surround view 60 by processing and stitching the image data 80, for example, and projecting the image data 80 on a bowl-shaped model 70, at box 116. The bowl-shaped model 70 may have a 3-dimensional shape, as shown in FIG. 4, based on initial calibration position data $d_1$. The initial calibration position data $d_1$ may be selected or set based on a distance from a target object, such as, for example, object C.

According to the present disclosure, at box 118, the object detection system 40, which may also utilize or include the controller 44, or another controller or processor, may detect objects, such as objects A and B, in the target field of view FV of the machine 10 and determine positions of the objects A and B. At box 120, the object position data generated by the object detection system 40 may be processed and filtered, as described herein, and used by the controller 44 to modify the 3-dimensional shape of the bowl-shaped model 70. That is, the 3-dimensional shape may be modified such that a diameter of the modified 3-dimensional shape may be based on an updated distance $d_2$. This may occur, for example, when the machine 10 moves into a location (e.g., a bay for service) and surrounding objects become closer to the machine 10 and/or when the machine 10 moves along a high wall or wall-like obstruction and surrounding objects are much closer to one side of the machine 10 than the other.

Figure 6:
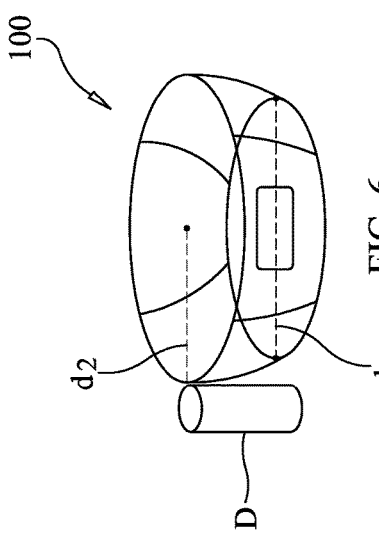
FIG. 6 is a bowl-shaped model, such as the bowl-shaped model of FIG. 4, having a modified 3-dimensional shape, according to the present disclosure.

Thus, the bowl-shaped model 100 of FIG. 6 may have a modified 3-dimensional shape, as compared to the bowl-shaped model 70 of FIG. 4. The inner diameters and/or outer diameters may be modified, and do not have to be purely circular or elliptical in shape. For instance, the resulting shape and/or view may be asymmetrical. However, the resulting shape should have a smooth gradient between the geometries so that unnecessary artifacts and/or distortions are not caused in the resulting image. An updated 3-dimensional composite surround view, which may be similar to the 3-dimensional composite surround view 60 of FIG. 3, may be generated by projecting the image data 80 on the bowl-shaped model 100 having a modified 3-dimensional shape. The updated 3-dimensional composite surround view may be displayed on the user display 42, at box 124.

The 3-dimensional shape of the bowl-shaped model used for creating the 3-dimensional composite surround view may have initial calibration position data, which may be based on a distance from a target object. As the machine travels through different environments, the 3-dimensional composite surround view based on the 3-dimensional shape of the bowl-shaped model, as initially calibrated, may become distorted or degraded. According to the present disclosure, objects within a target field of view of the machine may be detected and processed, with one or more of the detected objects being used to "re-calibrate" (or modify) the bowl-shaped model. In particular, the shape may be modified such that a diameter, or other dimension, of the modified 3-dimensional shape is based on an updated distance corresponding to the one or more objects. For example, a geometric equation or model may be used to calculate an updated diameter based on the detected objects. In some instances, the diameter may be reduced at areas where objects are detected in close proximity to the machine 10. As such, a more realistic, and less distorted, representation of the environment on a 2-dimensional display is provided.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A surround view system for a machine, the surround view system including:
   one or more devices configured to generate image data of surroundings of the machine;
   one or more processors configured to:
      generate an initial 3-dimensional composite surround view by projecting the image data on a virtual model corresponding to the machine,
         wherein the virtual model has a 3-dimensional shape based on initial calibration position data;
      detect a first object and a second object in a target field of view of the machine;
      filter, based on a size of the first object and a size of the second object, data for the first object and the second object to determine to consider the first object and ignore the second object;
      modify, to obtain a modified 3-dimensional shape, the 3-dimensional shape of the virtual model based on a position of the first object after filtering data for the first object and the second object; and
      generate an updated 3-dimensional composite surround view by projecting the image data on the virtual model having the modified 3-dimensional shape.

2. The surround view system of claim 1, wherein, when modifying the 3-dimensional shape of the virtual model, the one or more processors are configured to:
   modify an inner diameter of the virtual model and an outer diameter of the virtual model independently.

3. The surround view system of claim 1, wherein, when modifying the 3-dimensional shape of the virtual model, the one or more processors are configured to:
   modify an inner diameter of the virtual model, and
   modify an outer diameter of the virtual model as a function of the inner diameter.

4. The surround view system of claim 1,
   wherein the virtual model is a bowl-shaped model, and
   wherein the modified 3-dimensional shape is asymmetrical.

5. The surround view system of claim 1, wherein at least one of a radar, a laser, LiDAR, video, or ultrasound is used to detect the first object.

6. The surround view system of claim 5, wherein the one or more processors are configured to:
   generate object position data corresponding to the position of the first object.

7. The surround view system of claim 1, further including:
   a user display configured to display the updated 3-dimensional composite surround view.

8. A method including:
   generating image data of surroundings of a machine;
   generating an initial 3-dimensional composite surround view by projecting the image data on a virtual model, wherein the virtual model has a 3-dimensional shape based on an initial calibration position data;
detecting a first object and a second object in a target field of view of the machine;
filtering, based on a size of the first object and a size of the second object, data for the first object and the second object to determine to consider the first object and ignore the second object;
modifying, to obtain a modified 3-dimensional shape, the 3-dimensional shape of the virtual model based on object position data, corresponding to the first object, after filtering the data for the first object and the second object;
generating an updated 3-dimensional composite surround view by projecting the image data on the virtual model having a modified 3-dimensional shape; and
providing, for display, the updated 3-dimensional composite surround view on a user display.

9. The method of claim 8, wherein modifying the 3-dimensional shape includes:
modifying an inner diameter of the virtual model and an outer diameter of the virtual model independently.

10. The method of claim 8, wherein modifying the 3-dimensional shape includes:
modifying an inner diameter of the virtual model, and
modifying an outer diameter of the virtual model as a function of the inner diameter.

11. The method of claim 8, wherein modifying the 3-dimensional shape of the virtual model includes:
generating an asymmetrical shape of the virtual model.

12. The method of claim 8, wherein the updated 3-dimensional composite surround view is generated and displayed while the machine is in motion.

13. The method of claim 8, further including:
generating the object position data.

14. An image processing system for generating a 3-dimensional composite surround view, the image processing system including:
a memory; and
a processor configured to:
receive image data of surroundings of a machine;
generate an initial 3-dimensional composite surround view by projecting the image data on a virtual model;
receive object position data corresponding to a first object and a second object in a target field of view of the machine;
filter, based on a size of the first object and a size of a second object, the object position data corresponding to the first object and the second object to determine to consider the first object and ignore the second object;
modify, to obtain a modified 3-dimensional shape, the 3-dimensional shape of the virtual model based on a position of the first object after filtering the object position data corresponding to the first object and the second object; and
generate an updated 3-dimensional composite surround view by projecting the image data on the virtual model having the modified 3-dimensional shape.

15. The image processing system of claim 14, wherein, when modifying the 3-dimensional shape of the virtual model, the processor is configured to:
modify an inner diameter of the virtual model and an outer diameter of the virtual model independently.

16. The image processing system of claim 14, wherein, when modifying the 3-dimensional shape of the virtual model, the processor is configured to:
modify an inner diameter of the virtual model, and
modify an outer diameter of the virtual model as a function of the inner diameter.

17. The image processing system of claim 14, wherein the modified 3-dimensional shape is asymmetrical.

18. The image processing system of claim 14, further including:
at least four cameras configured to generate the image data.

19. The image processing system of claim 18, wherein each of the four cameras includes a fisheye lens.

20. The image processing system of claim 14, wherein the processor is further configured to:
transmit the updated 3-dimensional composite surround view to a user display.

* * * * *